United States Patent [19]
Regan

[11] Patent Number: 5,987,800
[45] Date of Patent: Nov. 23, 1999

[54] SCENTED TRAIL MAKING DEVICE

[76] Inventor: Michael Regan, 6763 Minnick Rd., Lock 77, Lockport, N.Y. 14094

[21] Appl. No.: 09/046,028

[22] Filed: Mar. 23, 1998

[51] Int. Cl.$^6$ .................................................. A01M 27/00
[52] U.S. Cl. .................................................................... 43/1
[58] Field of Search ....................................................... 43/1

[56] References Cited

U.S. PATENT DOCUMENTS

| D. 351,934 | 11/1994 | Devoe | D2/946 |
|---|---|---|---|
| 3,046,192 | 7/1962 | Bilyeu | 43/1 |
| 4,186,502 | 2/1980 | Foster | 36/136 |
| 4,302,899 | 12/1981 | DeHart | 43/1 |
| 4,402,560 | 9/1983 | Swainback | 339/175 |
| 4,682,715 | 7/1987 | Reeves | 222/175 |
| 4,691,466 | 9/1987 | Lamb | 43/43.13 |
| 4,722,477 | 2/1988 | Floyd | 239/36 |
| 4,735,010 | 4/1988 | Grinarml | 43/1 |
| 5,060,411 | 10/1991 | Uhlman | 43/1 |
| 5,074,439 | 12/1991 | Wilcox | 222/175 |
| 5,111,981 | 5/1992 | Allen | 224/202 |
| 5,148,949 | 9/1992 | Luca | 222/175 |
| 5,161,646 | 11/1992 | Aurich et al. | 222/187 |
| 5,327,667 | 7/1994 | Fore | 43/14 |
| 5,461,814 | 10/1995 | Reid et al. | 43/1 |
| 5,465,521 | 11/1995 | Baker et al. | 43/1 |
| 5,655,693 | 8/1997 | Engelman et al. | 223/119 |
| 5,664,712 | 9/1997 | Smrt | 224/250 |
| 5,672,342 | 9/1997 | Bell | 417/84 |
| 5,761,843 | 6/1998 | Lynch et al. | 43/4.5 |

FOREIGN PATENT DOCUMENTS 603037  8/1978  Switzerland .................................. 43/1

*Primary Examiner*—Michael J. Carone
*Assistant Examiner*—Fredrick T. French, III

[57] ABSTRACT

A scented trail making device including a spring-biased alligator clamp. A length of rope is secured to the alligator clamp. A retention portion is secured to the length of rope. A piece of cloth is slidably disposed within the retention portion. A scented liquid soaks the piece of cloth. The clamp is secured to a pant leg of a hunter whereby the soaked piece of cloth will drag along a ground area to leave a scented trail that will attract deer to a hunting site.

3 Claims, 3 Drawing Sheets

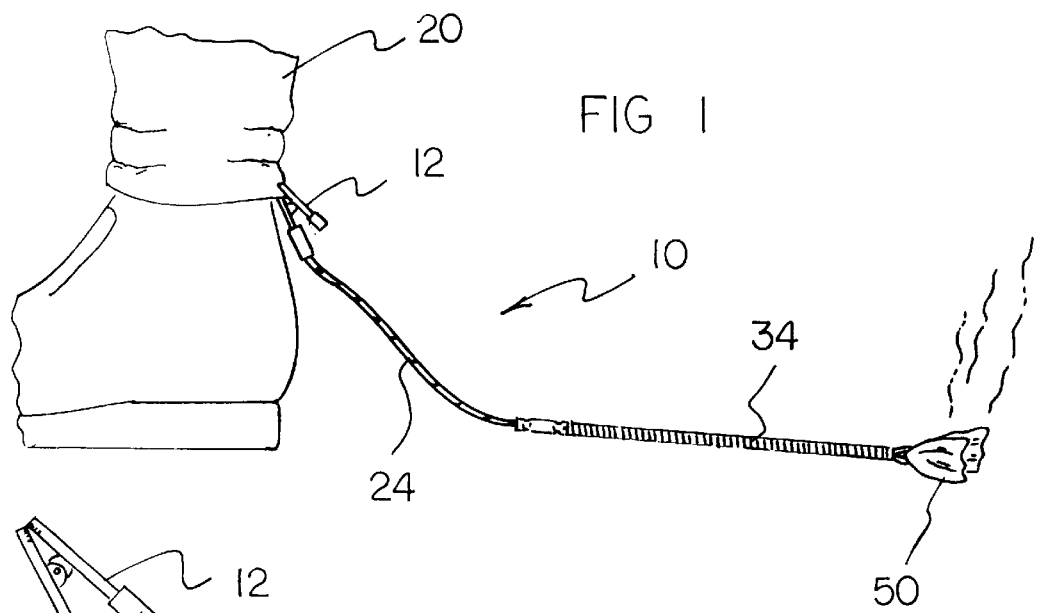
FIG 1
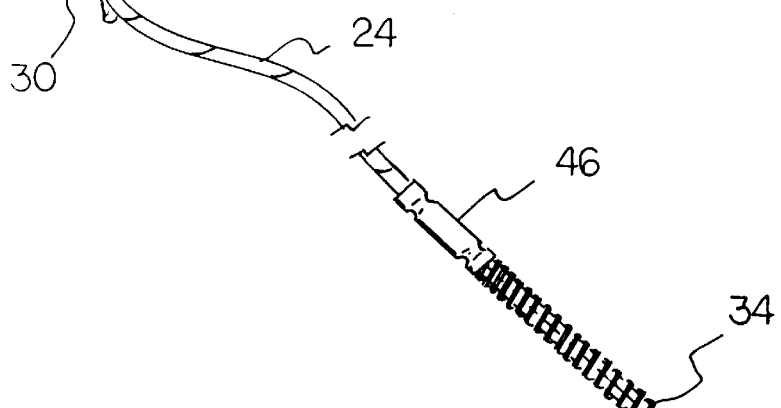
FIG 2

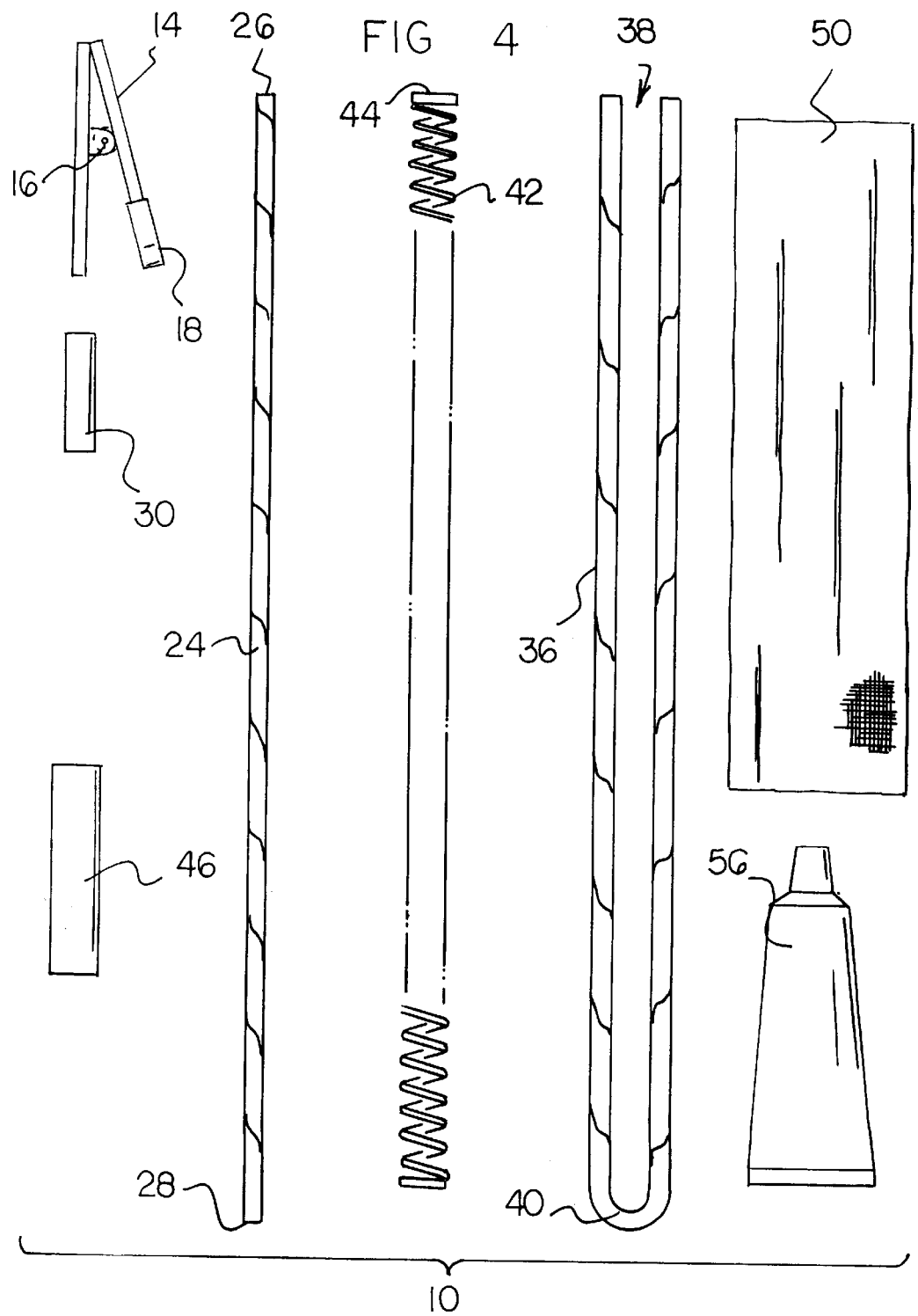

SCENTED TRAIL MAKING DEVICE

BACKGROUND OF THE INVENTION

1. Field of the Invention

The present invention relates to a scented trail making device and more particularly pertains to luring deer to a hunting site with a scented trail making device.

2. Description of the Prior Art

The use of scent dispensers is known in the prior art. More specifically, scent dispensers heretofore devised and utilized for the purpose of dispensing scents for hunters are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,074,439 to Wilcox discloses a scent or lure dispensing device.

U.S. Pat. No. 4,735,010 to Grinarml discloses a scent dispenser for attachment under a shoe.

U.S. Pat. No. Des. 351,934 to Devoe discloses the ornamental design for a disposable scent pad.

U.S. Pat. No. 4,722,477 to Floyd discloses a scented hunting strap.

U.S. Pat. No. 4,682,715 to Reeves discloses a detachable shoe-lure dispenser.

U.S. Pat. No. 5,161,646 to Aurich discloses an animal attractant scent dispensing device.

While these devices fulfill their respective, particular objective and requirements, the aforementioned patents do not describe a scented trail making device for luring deer to a hunting site.

In this respect, the scented trail making device according to the present invention substantially departs from the conventional concepts and designs of the prior art, and in doing so provides an apparatus primarily developed for the purpose of luring deer to a hunting site.

Therefore, it can be appreciated that there exists a continuing need for new and improved scented trail making device which can be used for luring deer to a hunting site. In this regard, the present invention substantially fulfills this need.

SUMMARY OF THE INVENTION

In the view of the foregoing disadvantages inherent in the known types of scent dispensers now present in the prior art, the present invention provides an improved scented trail making device. As such, the general purpose of the present invention, which will be described subsequently in greater detail, is to provide a new and improved scented trail making device and method which has all the advantages of the prior art and none of the disadvantages.

To attain this, the present invention essentially comprises a spring-biased alligator clamp comprised of a pair of members pivotally coupled together at intermediate portions thereof. A free end of one of the members has a textured element disposed thereon. The device includes a length of rope having a first end and a second end. The first end is coupled to a free end of one of the pair of members of the alligator clamp. The device includes a retention portion comprised of an elongated and flexible generally U-shaped housing. The housing has an open upper end and a closed lower end. The retention portion includes an elongated coil spring. The elongated coil spring is slidably received over the open upper end of the housing. An upper end of the elongated coil spring has a connector portion secured thereto. An upper end of the connector portion is secured to the second end of the length of rope. A piece of cloth is slidably disposed between a lower end of the elongated coil spring and the closed lower end of the elongated and flexible generally U-shaped housing of the retention portion. The device includes a scented liquid that is contained within a bottle. The scented liquid soaks the piece of cloth.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved scented trail making device which has all the advantages of the prior art scent dispensers and none of the disadvantages.

It is another object of the present invention to provide a new and improved scented trail making device which may be easily and efficiently manufactured and marketed.

It is a further object of the present invention to provide a new and improved scented trail making device which is of durable and reliable construction.

An even further object of the present invention is to provide a new and improved scented trail making device which is susceptible of a low cost of manufacture with regard to both materials and labor, and which accordingly is then susceptible of low prices of sale to the consuming public, thereby making such a scented trail making device economically available to the buying public.

Even still another object of the present invention is to provide a new and improved scented trail making device for luring deer to a hunting site.

Lastly, it is an object of the present invention to provide a new and improved scented trail making device including a spring-biased alligator clamp. A length of rope is secured to the alligator clamp. A retention portion is secured to the length of rope. A piece of cloth is slidably disposed within the retention portion. A scented liquid soaks the piece of cloth. The clamp is secured to a pant leg of a hunter whereby the soaked piece of cloth will drag along a ground area to leave a scented trail that will attract deer to a hunting site.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the present invention illustrated attached to a hunter's pant leg.

FIG. 2 is a perspective view of the preferred embodiment of the scented trail making device constructed in accordance with the principles of the present invention.

FIG. 4 is an exploded plan view of the present invention.

The same reference numerals refer to the same parts through the various Figures.

DESCRIPTION OF THE PREFERRED EMBODIMENT

Figure 3:
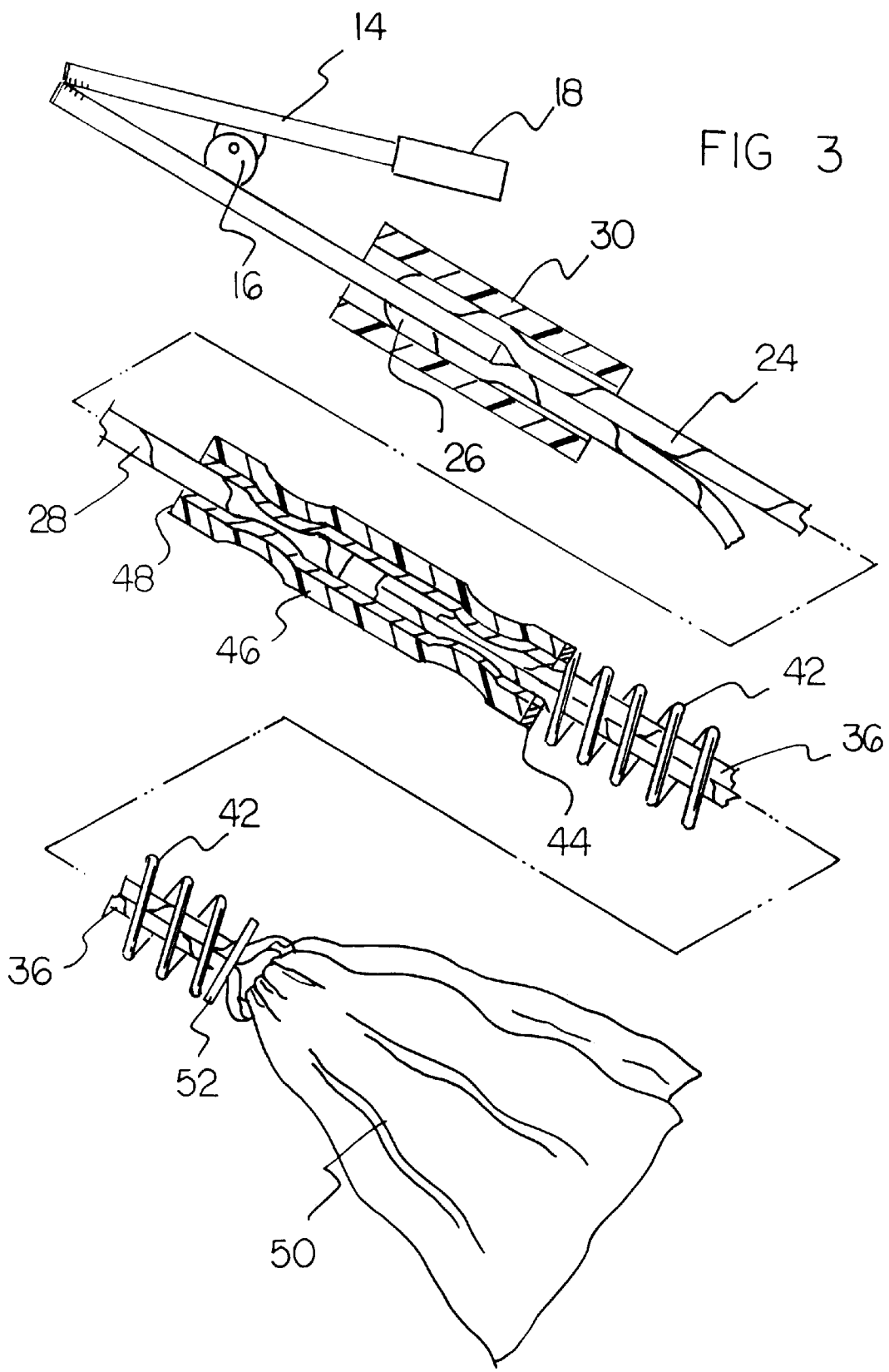
FIG. 3 is an exploded perspective view of the present invention.

With reference now to the drawings, and in particular, to FIGS. 1 through 4 thereof, the preferred embodiment of the new and improved scented trail making device embodying the principles and concepts of the present invention and generally designated by the reference number 10 will be described.

Specifically, it will be noted in the various Figures that the device relates to a scented trail making device for luring deer to a hunting site. In its broadest context, the device consists of a spring-biased alligator clamp, a length of rope, a retention portion, a piece of cloth and a scented liquid. Such components are individually configured and correlated with respect to each other so as to attain the desired objective.

The device 10 includes a spring-biased alligator clamp 12 comprised of a pair of members 14 pivotally coupled together at intermediate portions 16 thereof. A free end of one of the members 14 has a textured element 18 disposed thereon. The alligator clamp 12 allows for the device 10 to be secured to a pant leg 20 of a hunter. Note FIG. 1. The textured element 18 allows for the hunter to comfortably manipulate the alligator clamp 12 to facilitate the securement or removal thereof with respect to the hunter's pant leg 20.

Next, the device 10 includes a length of rope 24 having a first end 26 and a second end 28. The first end 26 is coupled to a free end of one of the pair of members 14 of the alligator clamp 12. The coupling of the length of rope 24 with the alligator clamp 12 is achieved through the use of a rigid tube 30 extending around the free end of the member 14 and the first end 26 of the length of rope 24. The first end 26 is threaded through an aperture in the free end of the member 14 and doubled over within the rigid tube 30. Note FIG. 3. The length of rope 24 will be long enough to hang freely from the pant leg 20 of the hunter to contact a ground area.

The device 10 includes a retention portion 34 comprised of an elongated and flexible generally U-shaped housing 36. The housing 36 has an open upper end 38 and a closed lower end 40. The retention portion 34 includes an elongated coil spring 42. The elongated coil spring 42 is slidably received over the open upper end 38 of the housing 36. An upper end 44 of the elongated coil spring 42 has a connector portion 46 secured thereto. An upper end 48 of the connector portion 46 is secured to the second end 28 of the length of rope 24.

A piece of cloth 50 is slidably disposed between a lower end 52 of the elongated coil spring 42 and the closed lower end 40 of the elongated and flexible generally U-shaped housing 36 of the retention portion 34. The elongated coil spring 42 biases downwardly to compress the housing 36 for retention of the piece of cloth 50 therebetween. Removal of the piece of cloth 50 is facilitated by the upward lifting of the elongated coil spring 42 which will allow separation of the piece of cloth 50 from the housing 36. Note FIGS. 2 and 3. The piece of cloth 50 is comprised of an absorbent material.

Lastly, the device 10 includes a scented liquid that is contained within a bottle 56. The scented liquid soaks the piece of cloth 50. The scented liquid is absorbed by the piece of cloth 50 whereby when the piece of cloth 50 is dragged along the ground area, the scented liquid will be dispensed from the piece of cloth 50 to leave a scented trail for the attraction of deer and other wild game to be attracted to a predetermined hunting site of the hunter. Note FIG. 1. Once the piece of cloth 50 has lost its scent, it is removed from the retention portion 34 for soaking with more of the scented liquid.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A scented trail making kit for luring deer to a hunting site comprising, in combination:

a spring-biased alligator clamp comprised of a pair of members pivotally coupled together at intermediate portions thereof, a free end of one of the members having a textured element disposed thereon;

a length of rope having a first end and a second end, the first end coupled to a free end of one of the pair of members of the alligator clamp;

a retention portion comprised of an elongated and flexible generally U-shaped housing, the housing having an open upper end and a closed lower end, the retention portion including an elongated coil spring, the elongated coil spring slidably received over the open upper end of the housing, an upper end of the elongated coil spring having a connector portion secured thereto, an upper end of the connector portion secured to the second end of the length of rope;

a piece of cloth slidably disposed between a lower end of the elongated coil spring and the closed lower end of the elongated and flexible generally Ushaped housing of the retention portion; and a scented liquid contained within a bottle, for storage when not in use and from which the liquid can be dispensed from during operation when, the scented liquid soaks the piece of cloth.

2. A scented trail making kit comprising: a spring-biased alligator clamp;

a length of rope coupled to the alligator clamp;

a retention portion secured to the length of rope;

a piece of cloth slidably disposed within the retention portion;

a scented liquid soaking the piece of cloth;

wherein the retention portion is comprised of an elongated and flexible generally U-shaped housing, the housing having an open upper end and a closed lower end, the retention portion including an elongated coil spring, the elongated coil spring slidably received over the open upper end of the housing, an upper end of the elongated coil spring having a connector portion secured thereto, an upper end of the connector portion secured to the length of rope, and wherein the piece of cloth is slidably disposed between a lower end of the elongated coil spring and the closed lower end of the elongated and flexible generally U-shaped housing of the retention portion.

3. A scented trail making kit comprising:

a spring-biased alligator clamp;

a length of rope coupled to the alligator clamp;

a retention portion secured to the length of rope;

a piece of cloth slidably disposed within the retention portion;

a scented liquid soaking the piece of cloth;

wherein the retention portion is comprised of an elongated and flexible generally U-shaped housing, the housing having an open upper end and a closed lower end, the retention portion including an elongated coil spring, the elongated coil spring slidably received over the open upper end of the housing, an upper end of the elongated coil spring having a connector portion secured thereto, an upper end of the connector portion secured to the length of rope.

* * * * *